US012232649B1

United States Patent
Yu et al.

(10) Patent No.: US 12,232,649 B1
(45) Date of Patent: Feb. 25, 2025

(54) ELECTRIC ARC GRILL

(71) Applicant: SHENZHEN TERRA MAESTRO TECHNOLOGY CO., LTD., Shenzhen (CN)

(72) Inventors: Bao-Quan Yu, Fuzhou (CN); Nan-Qiao Yao, Shenzhen (CN); Chung Wai, Shenzhen (CN)

( * ) Notice: Subject to any disclaimer, the term of this patent is extended or adjusted under 35 U.S.C. 154(b) by 0 days.

(21) Appl. No.: 18/895,707

(22) Filed: Sep. 25, 2024

(30) Foreign Application Priority Data

Nov. 25, 2023 (CN) .......................... 202311584438.4

(51) Int. Cl.
*A47J 37/07* (2006.01)
*F24C 15/14* (2006.01)
*H05B 7/20* (2006.01)

(52) U.S. Cl.
CPC ....... *A47J 37/0709* (2013.01); *A47J 37/0754* (2013.01); *A47J 37/0786* (2013.01); *F24C 15/14* (2013.01); *H05B 7/20* (2013.01)

(58) Field of Classification Search
CPC ................ A47J 37/0709; A47J 37/0754; A47J 37/0786; F24C 15/14; H05B 7/20
USPC .................................................... 219/121.11
See application file for complete search history.

(56) References Cited

U.S. PATENT DOCUMENTS 4,496,827 A * 1/1985 Sturdevant ................ F24C 7/00
219/404

FOREIGN PATENT DOCUMENTS

CN      108758723    * 11/2018
CN      210568642    * 5/2020

* cited by examiner

*Primary Examiner* — Dana Ross
*Assistant Examiner* — Joseph W Iskra
(74) *Attorney, Agent, or Firm* — Nitin Kaushik

(57) ABSTRACT

The present application pertains to an electric arc grill that integrates a range of components for enhanced functionality. Central to this grill is the electric heating device, which includes an electric heating component and a circuit board integrated with electric components. The electric heating component includes an electric output head and an electric connection rod that is securely attached to and electrically connected with the head, ensuring a stable connection to the circuit board. The grill is equipped with a lifting device that is affixed to and grounded by the grill carrier, facilitating the electrical connection with the fire gathering plate. This plate is positioned above the electric output head, creating a gap that is instrumental in generating the electric arc necessary for heating. The grill enables the fire gathering plate to be heated via electric arc, thereby providing a versatile cooking surface capable of frying, grilling, and baking.

20 Claims, 9 Drawing Sheets

ELECTRIC ARC GRILL

FIELD

The subject matter relates to an electric arc grill.

BACKGROUND

Existing grills may fry, grill, or bake food by burning charcoal or gas.

However, when using grills with chemical fuels such as charcoal and gas, it is essential to consider the convenience of fuel supply. For example, when the charcoal in the grill is nearly exhausted, it is necessary to add and ignite new charcoal. Moreover, controlling the heat intensity and heating area can be challenging with chemical fuels like charcoal and gas, which may lead to inconsistent frying and grilling results. Additionally, it is difficult to designate separate areas within the grill for frying and grilling.

Maintaining cleanliness and hygiene for a grill, especially when dealing with oil stains from the frying, grilling or baking process, is essential for ensuring stable operation and use. Collecting and processing these oil stains can be challenging, making it a critical aspect of grill maintenance.

Therefore, there is room for improvement in the art.

SUMMARY

The present disclosure provides an electric arc grill, which includes an electric heating device, a fire gathering plate, a lifting device, and a grill carrier. The electric heating device includes at least one electric heating component and a circuit board with an electric component. The electric heating component includes an electric output head and an electric connection rod electrically connected to the electric output head. The electric connection rod is fixed and electrically connected to the circuit board. The lifting device is connected to the grill carrier and grounded. The fire gathering plate is electrically connected to the lifting device. The electric output head is located below the fire gathering plate, and a gap is formed between the electric output head and the fire gathering plate.

The present disclosure encompasses a variety of aspects and potential applications. The summary provided and the detailed description that follows are not meant to restrict the scope of the disclosure to specific embodiments. Instead, they serve to illustrate a range of possible implementations, acknowledging that other embodiments may also be conceived within the spirit of the present disclosure.

DETAILED DESCRIPTION

Implementations of the present technology will now be described, by way of example only, with reference to the attached figures.

Figure 6:
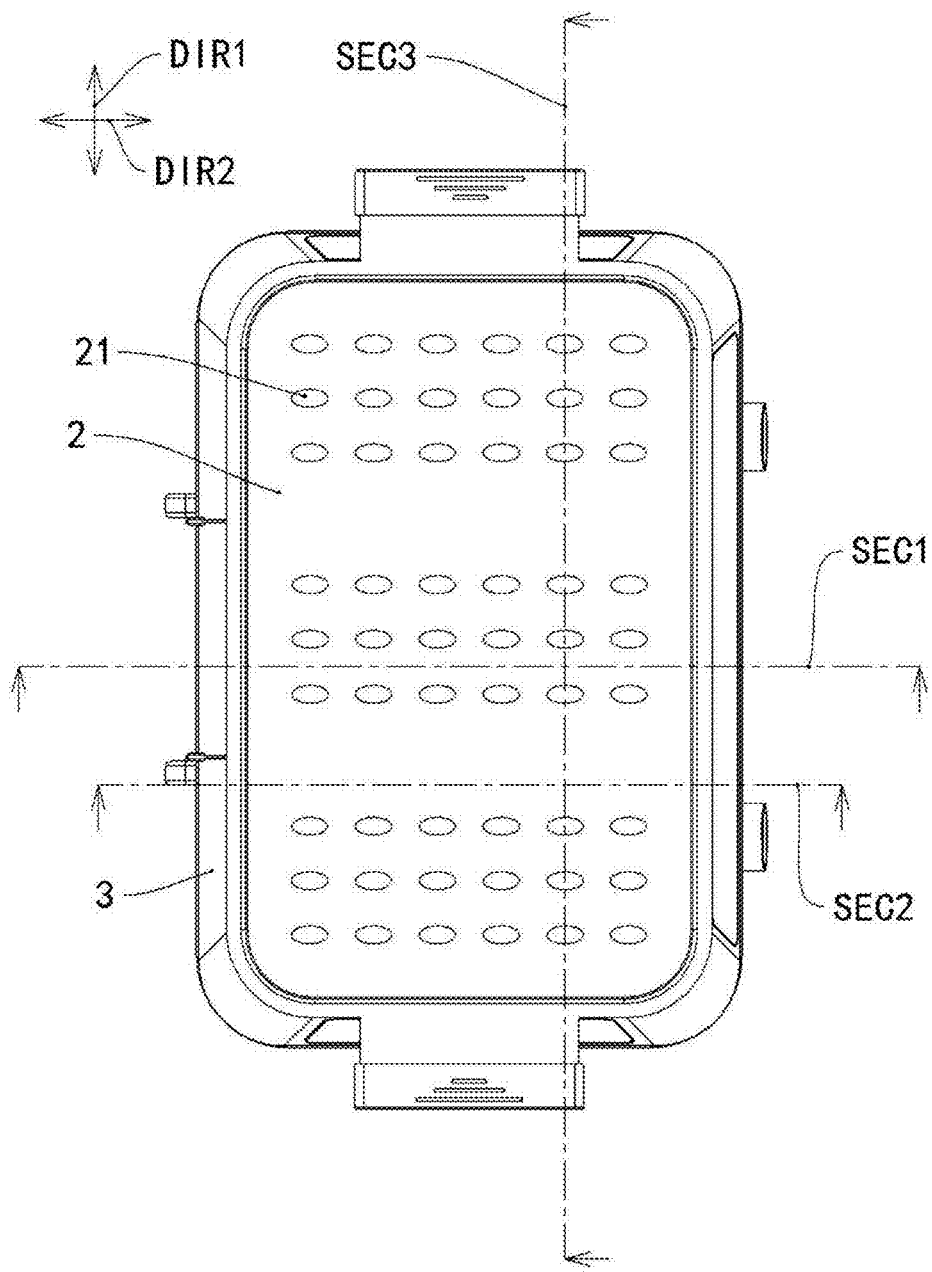
FIG. 6 is a top view of the electric arc grill according to an embodiment of the present application.

Referring to FIGS. 1 to 9, the electric arc grill of the present application includes an electric heating device 1, a fire gathering plate 2, a lifting device 3, and a grill carrier 8. Referring to FIG. 6, a direction DIR1 represents a length direction, and a direction DIR2 represents a width direction. A direction perpendicular to the paper surface in FIG. 6 is a height direction.

The electric heating device 1 includes at least one electric heating component 11 and a circuit board 12. The circuit board 12 is equipped with at least one electric component 121. Each electric heating components 11 includes an electric output head 111 and an electric connection rod 112 electrically connected to the electric output head 111. The electric connection rod 112 may be fixed to or detachably connected to the electric output head 111. The electric connection rod 112 is fixed and electrically connected to the circuit board 12. For example, a bottom surface of the circuit board 12 is equipped with a connection member 122 (shown in FIGS. 7 and 9), and a bottom end of the electric connection rod 112 extends through the circuit board 12, and is soldered or connected to the connection member 122 of the circuit board 12. The connection member 122 may be a solder pad or a screw nut. In at least one embodiment, the electric heating device 1 includes a number of electric heating components 11. When indicating the electric heating components 11 are same, the size and material of the electric heating components 11 are same. In at least one embodiment, the electric output heads 111 are positioned at a same horizontal height, and therefore, the size of the bottom ends of the electric connection rods 112 protruding from the bottom surface of the circuit board 12 may be easily controlled. Batch processing of the electric heating device 1 may be achieved, and the yield rate may be improved. The electric connection rod 112 is made of conductive material. The circuit board 12 and the electric component 121 there on may output a voltage to the electric output heads 111 through the electric connection rods 112, and the voltage is sufficient to create electric arc.

The lifting device 3 is connected to the grill carrier 8 and grounded. For example, the lifting device 3 is fixed to the grill carrier 8 through screwing, gluing, and other manners. The lifting device 3 is grounded by connecting to a ground wire of the power cord (not shown).

The fire gathering plate 2 and the lifting device 3 have electric conductivity, and the fire gathering plate 2 is electrically connected to the lifting device 3. For example, the fire gathering plate 2 and the lifting device 3 have an integrated structure (i.e., they are integrated into one component) to achieve electric connection therebetween. The fire gathering plate 2 includes a handle 29 and a heat insulation sleeve 291 surrounding the handle 29.

A bottom surface of the fire gathering plate 2 is a flat surface. The electric output heads 111 are located below the fire gathering plate 2. A gap is formed between the fire gathering plate 2 and the electric output heads 111.

In use, the circuit board 12 outputs a voltage sufficient to form an electric arc to the electric output heads 111, causing the electric arc to be formed between the electric output heads 111 and the fire gathering plate 2. The fire gathering plate 2 is then heated by the electric arc, thereby achieving the frying and baking functions.

In the exemplary embodiment, there are multiple electric heating components 11 being positioned at the same horizontal height. The distance between each electric output head 111 and the fire gathering plate 2 is equal to each other. As such, stable electric arc may be formed between each electric output head 111 and the fire gathering plate 2, thereby providing a stable heating power to the fire gathering plate 2.

In at least one embodiment, the electric heating device 1 further includes an electric insulation plate 13 located between the electric output heads 111 and the circuit board 12. The electric connection rod 112 extends through the electric insulation plate 13. The electric insulation plate 13 is made of an electric insulation material such as plastic and rubber. As such, electrical safety and reliability of the electric heating device 1 may be improved (by reducing the heat transfer to circuit board 12).

In at least one embodiment, the electric heating device 1 further includes an air driving device 18, which has a fixed position relative to the circuit board 12. For example, the air driving device 18 is fixed on the electric insulation plate 13, the circuit board 12, or the grill carrier 8. The air driving device 18 may output air along a direction substantially parallel to the circuit board 12. For example, the air driving device 18 is a centrifugal fan located near the edge of circuit board 12. The air driving device 18 has an air outlet parallel to circuit board 12 and facing the interior of circuit board 12. As such, the reliability of the electric heating device 1 may further be improved.

In at least one embodiment, a sidewall of the grill carrier 8 defines an air vent 82. In at least one embodiment, a bottom surface of the grill carrier 8 defines the air vent 82 and is further provided with a bottom pad 89. The air vent 82 may be an air outlet or an air inlet, which may reduce the temperature inside the grill carrier 8 and improve the reliability.

In at least one embodiment, an air guiding wall 821 is provided at the exterior of the air vent 82. For example, when the air vent 82 of the sidewall of the grill carrier 8 functions as an air outlet, the air guiding wall 821 may guide the air from the air outlet downwards, which may avoid discomfort caused by horizontal diffusion of the hot air.

In at least one embodiment, the electric heating device 1 further includes an electric insulation sleeve 14. The electric insulation sleeve 14 surrounds a sidewall of each electric connection rod 112, which may further improve the electricity safety. For example, the electric insulation sleeve 14 is cylindrical, and the electric connection rod 112 extends through and is in contact with the electric insulation sleeve 14. A bottom end of the electric insulation sleeve 14 is in contact with the electric insulation plate 13, which may improve the fixing strength of the electric heating component 11 on the electric insulation plate 13.

In at least one embodiment, the electric insulation sleeve 14 is made of ceramic, rubber, or plastic.

In at least one embodiment, the electric heating device 1 further includes a metal isolation cover 129. The metal isolation cover 129 surrounds the circuit board 12 and the electric component 121. The metal isolation cover 129 is made of metal such as aluminum alloy, which may reduce radiation from the circuit board 12 and the electric component 121 to the ambient environment.

In at least one embodiment, the fire gathering plate 2 defines at least one through hole 21, which is completely misaligned with the electric output head 111 when viewed along the vertical direction. In other words, no overlap exists between the through hole 21 and the electric output head 111 when viewed from along the vertical direction. When the oil stains generated by frying and baking food on the fire gathering plate 2 (for example, the fire gathering plate 2 is in direct contact with the food for frying purpose, or a gap exists between the fire gathering plate 2 and the food for baking purpose) drop through the through hole 21, the oil stains may keep away from the electric output heads 111, thereby reducing the risk of the oil stains and other droplets falling onto the electric output head 111. As such, the risk of the electric output head 111 being unable to generate an electric arc due to the attachment of oil stains may be reduced.

In at least one embodiment, when viewed along the vertical direction, each through hole 21 as a whole may be rhombic, rectangular, or elliptical, and a length of the through hole 21 along the length direction is different from a width of the through hole 21 along the width direction. For example, the through hole 21 is elliptical when viewed along the vertical direction, with a long axis of the ellipse along the width direction and a short axis of the ellipse along the length direction. The oil stains generated by frying and baking food on the heat gathering plate 2 will converge towards the larger one of the length and width of the through hole 21 (due to factors such as surface tension of the oil stains) and then drop. For example, the oil stains may converge towards a flatter end of the ellipse (i.e., the end where the long axis of the ellipse is located). As such, the risk of the oil stains and other droplets falling onto the electric output head 111 may further be reduced. In other embodiments, changes may also be made by rotating the through hole 21 within the horizontal plane, causing an angle to form between the original length of the through hole 21 and the length direction.

In at least one embodiment, an inner rim of the through hole 21 extends downwards to form a through hole wall (not shown). The through hole wall overlaps with an electric heating component hole flange 411 of an electric heating component hole 41 along the height direction. As such, the risk of the oil stains and other droplets falling on the electric output head 111 may further be reduced or avoided.

In at least one embodiment, the electric arc grill further includes an oil receiving plate 4. The oil receiving plate 4 defines at least one electric heating component hole 41, and is located between the electric output head 111 and the circuit board 12. Each electric connection rod 112 extends through one electric heating component hole 41. The oil receiving plate 4 is detachably connected to at least one of the circuit board 12, the fire gathering plate 2, the lifting device 3, the electric heating device 1, and the grill carrier 8. When the electric heating device 1 includes the electric insulation plate 13, the oil receiving plate 4 includes at least one height adjustment protrusion 421, which is placed on the electric insulation plate 13 to realize the detachable connection between the electric heating device 1 and the oil receiving plate 4. The oil stains generated by frying and baking food on the heat gathering plate 2 drop onto the oil receiving plate 4 through the through hole 21. After removing the oil receiving plate 4, the oil stains on the oil receiving plate 4 may be cleaned.

In at least one embodiment, an inner rim of each electric heating component hole 41 extends towards the fire gathering plate 2 to form the electric heating component hole flange 411, which may prevent the oil stains from dropping through the electric heating component hole 41.

In at least one embodiment, an inclined angle 42 is formed between a top surface of the oil receiving plate 4 and the horizontal plane. In other words, the top surface of the oil receiving plate 4 is inclined, which has a higher area and a lower area. The oil stains on the oil receiving plate 4 will flow towards the lower area, thereby facilitating the collection and treatment of the oil stains.

In at least one embodiment, an outer edge of the oil receiving plate 4 extends upwards to form an oil receiving plate wall 44.

In at least one embodiment, the height adjustment protrusion 421 is provided on a bottom surface of the oil receiving plate 4. The height adjustment protrusion 421 abuts against the circuit board 12 or the electric insulation plate 13, allowing the inclined angle 42 to be formed between the top surface of the oil receiving plate 4 and the horizontal plane. Besides the formation of the inclined angle 42, the height adjustment protrusion 421 also allows the oil receiving plate 4 to be easily removed for cleaning purpose.

In at least one embodiment, the oil receiving plate 4 further includes an oil receiving tray 49. The lower area of the oil receiving plate 4 defines an oil output port 43, which is connected to the oil receiving tray 49. The oil stains on the oil receiving plate 4 are dropped under their own weight and collected, thereby facilitating the cleaning of the oil receiving plate 4.

In at least one embodiment, the grill carrier 8 is equipped with a tray slot 491 and an oil output slot 492 connected to the tray slot 491. A top of the oil receiving tray 49 defines an opening, and the oil receiving tray 49 is located in the tray slot 491. When viewed along the vertical direction, the oil output slot 492 is partially located in the top opening of the oil receiving tray 49. The oil receiving tray 49 is integrated with the grill carrier 8 for facilitating the daily use. In other words, the oil stains and other contaminants may flow from the lower area of the oil receiving plate 4 into the oil receiving tray 49 through the oil output slot 492.

In at least one embodiment, an inner rim of the oil output port 43 extends downwards to form an oil output flange 431. The oil output flange 431 extends through the oil output slot 492 and has a fixed position relative to the grill carrier 8. For example, the electric insulation plate 13 defines an avoidance hole 134, and the electric insulation plate 13 has a fixed position relative to the grill carrier 8. The oil output flange 431 is in contact with the inner rim of the avoidance hole 134, thereby allowing the oil output flange 431 to extend through the oil output slot 492 and then have a fixed position relative to the grill carrier 8. Therefore, the position of the oil receiving plate 4 is fixed, thereby ensuring accurate positioning between the electric heating component 11 and the electric heating component hole 41.

In at least one embodiment, the lifting device 3 is has a hollow frame structure. The fire gathering plate 2 is detachably connected to the lifting device 3 and covers the top opening of the lifting device 3. The electric output head 111 and the lifting device 3 are overlapped with each other along the height direction, and a distance between the electric output head 111 and the bottom surface of the fire gathering plate 2 is less than a distance between the electric output head 111 and the inner wall of the lifting device 3. The top and bottom surfaces of the lifting device 3 have openings to obtain a frame structure. As such, reliable electric arc may be formed, and the fire gathering plate 2 is easily removed from the lifting device 3 for cleaning purpose.

Figure 7:
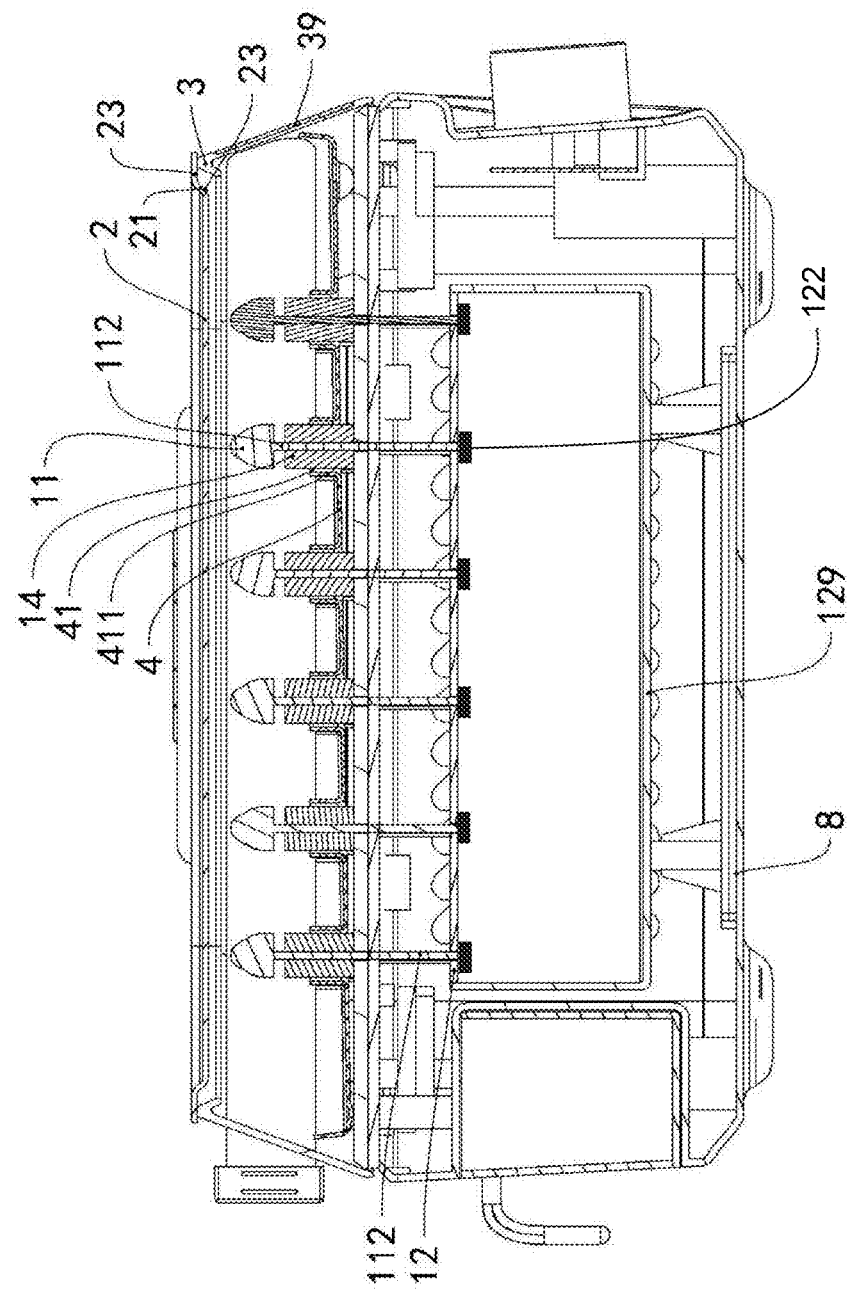
FIG. 7 is a cross-sectional view along SEC1 of FIG. 6.
Figure 8:
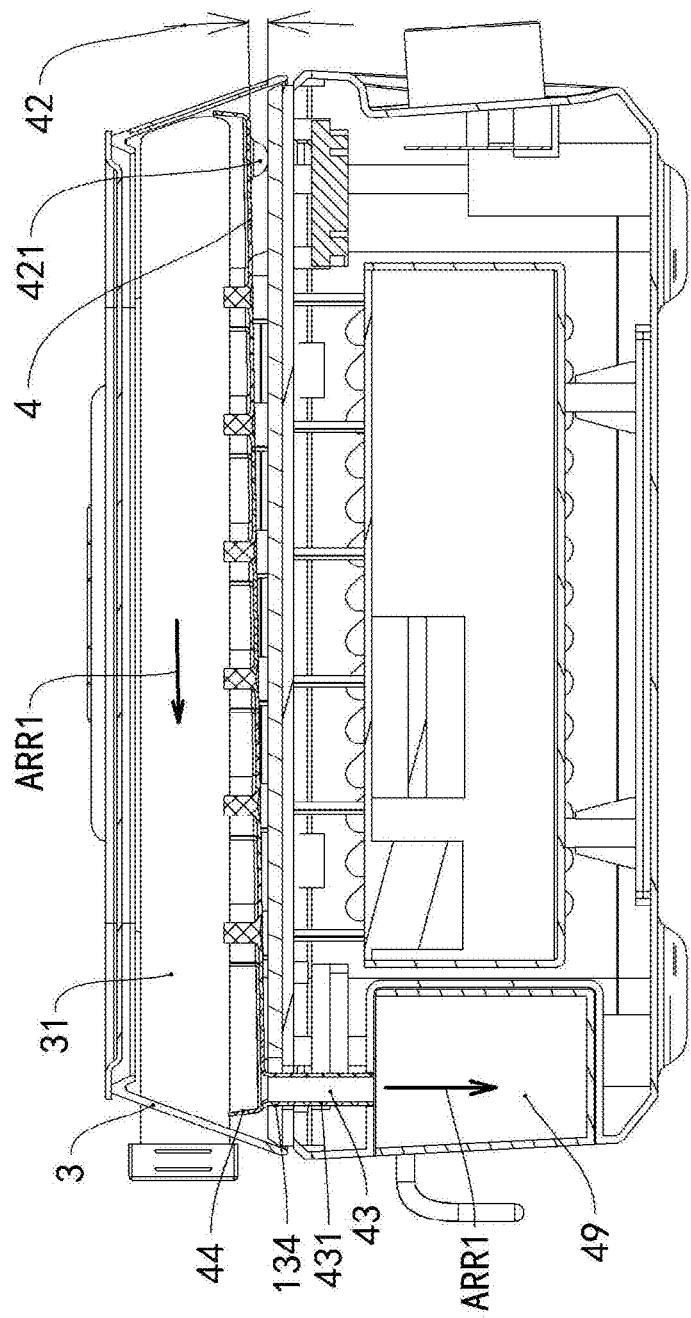
FIG. 8 is a cross-sectional view along SEC2 of FIG. 6, wherein ARR1 indicates a flowing direction and approximate path of oil stains on an oil receiving plate.
Figure 9:
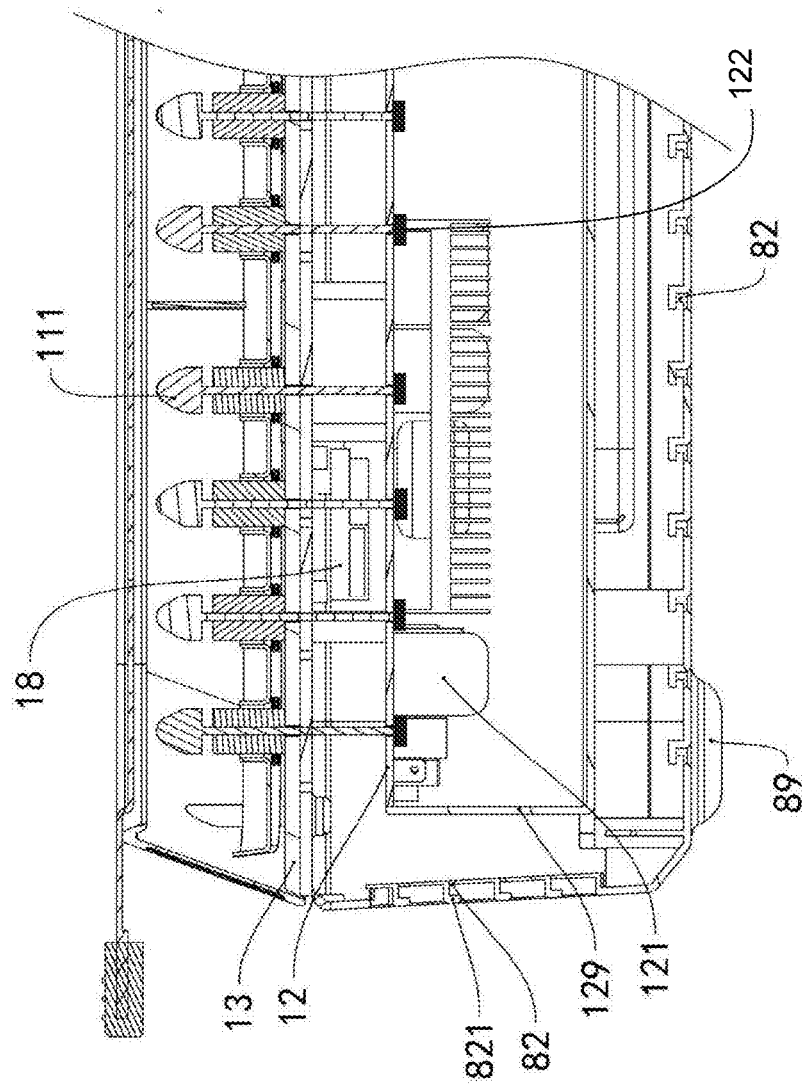
FIG. 9 is a cross-sectional view along SEC3 of FIG. 6.

In at least one embodiment, a cross-section of the lifting device 3 (the cross-section is taken along the horizontal plane and shown in FIG. 7) is rectangular and gradually decreases or increases from bottom to top. As such, the lifting device 3 as a whole is a truncated pyramid. In other embodiments, the cross-section of the lifting device 3 may also be circular or elliptical, and the lifting device 3 as a whole may be a truncated cone or truncated elliptical cone. When the cross-section decreases from bottom to top, the working state of the electric heating component 11 may be observed through a window 39. When the cross-section increases from bottom to top, when the food is taken away from the lifting device 3, the oil stains from the food can be prevented from dropping on the sidewall of the lifting device 3 and thereby maintaining cleanliness.

Figure 1:
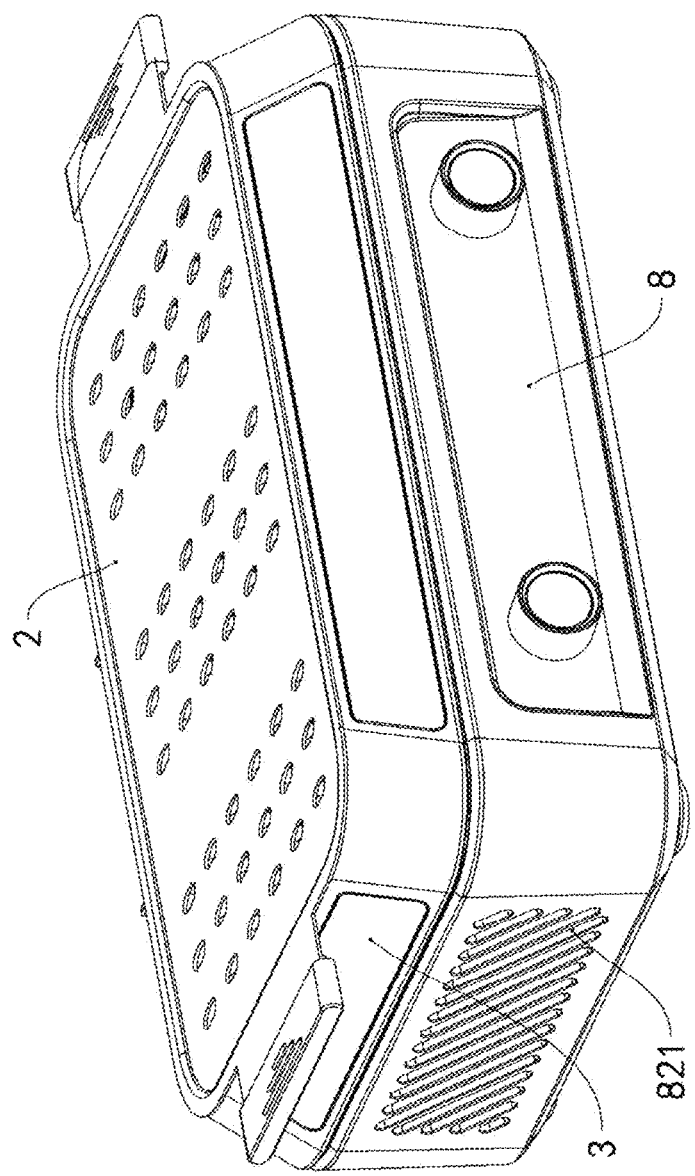
FIG. 1 is a diagrammatic view of an electric arc grill according to an embodiment of the present application.
Figure 2:
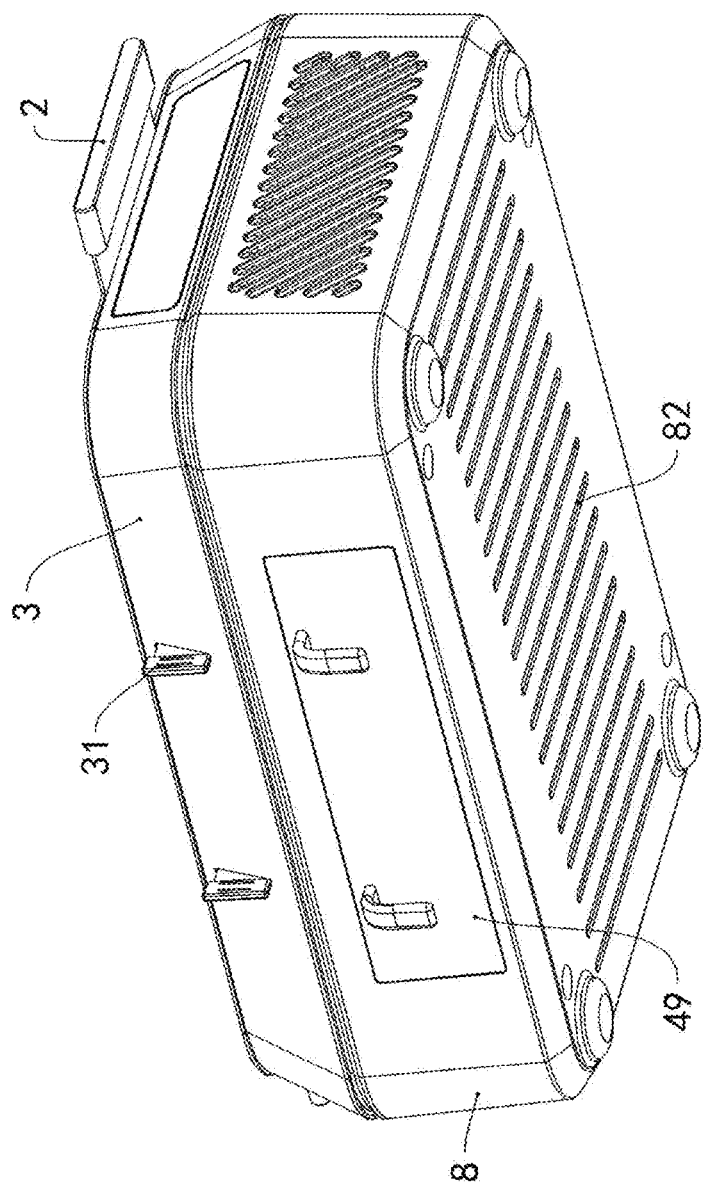
FIG. 2 is another diagrammatic view of the electric arc grill according to an embodiment of the present application.
Figure 3:
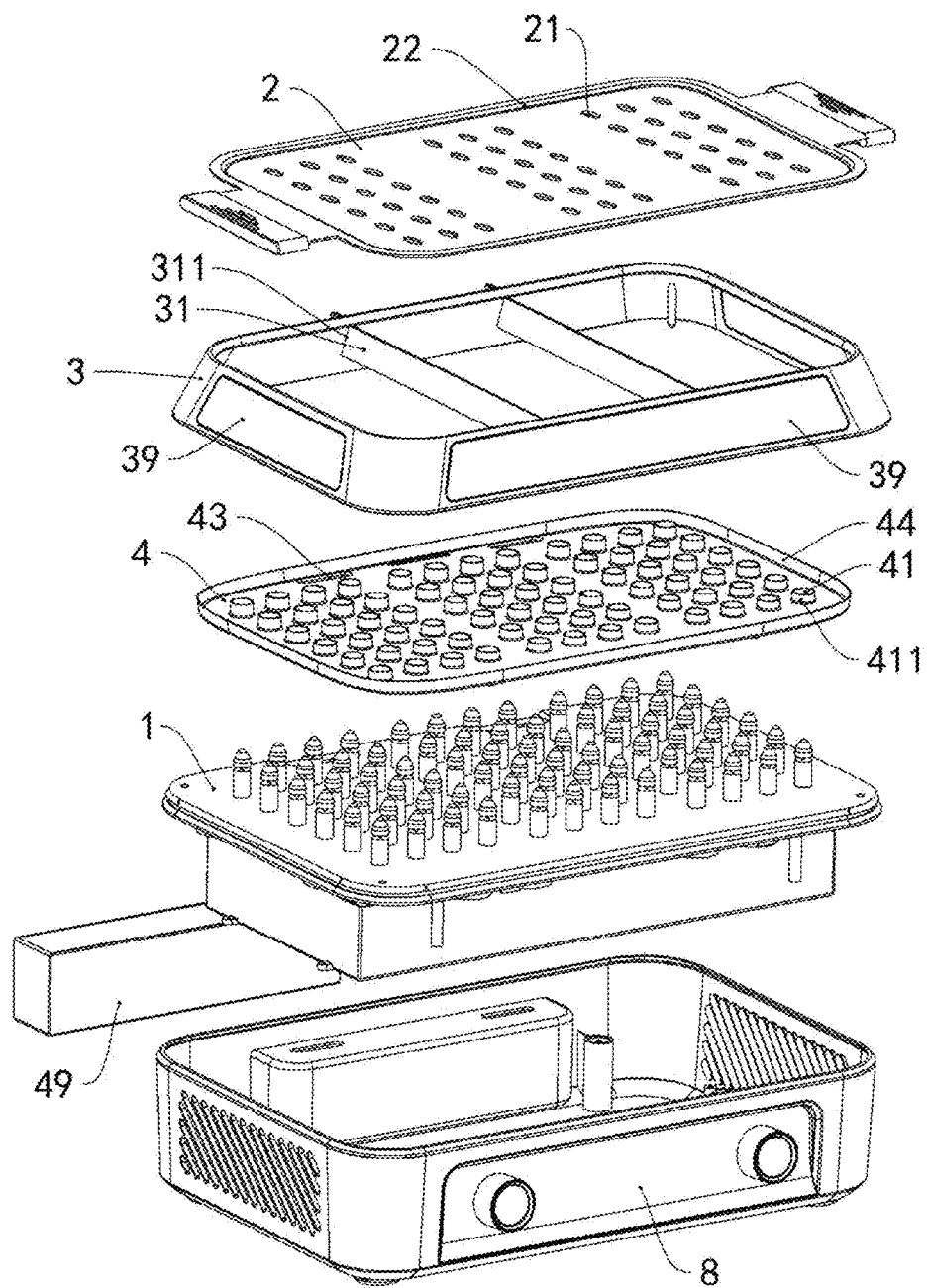
FIG. 3 is an exploded view of the electric arc grill according to an embodiment of the present application.
Figure 4:
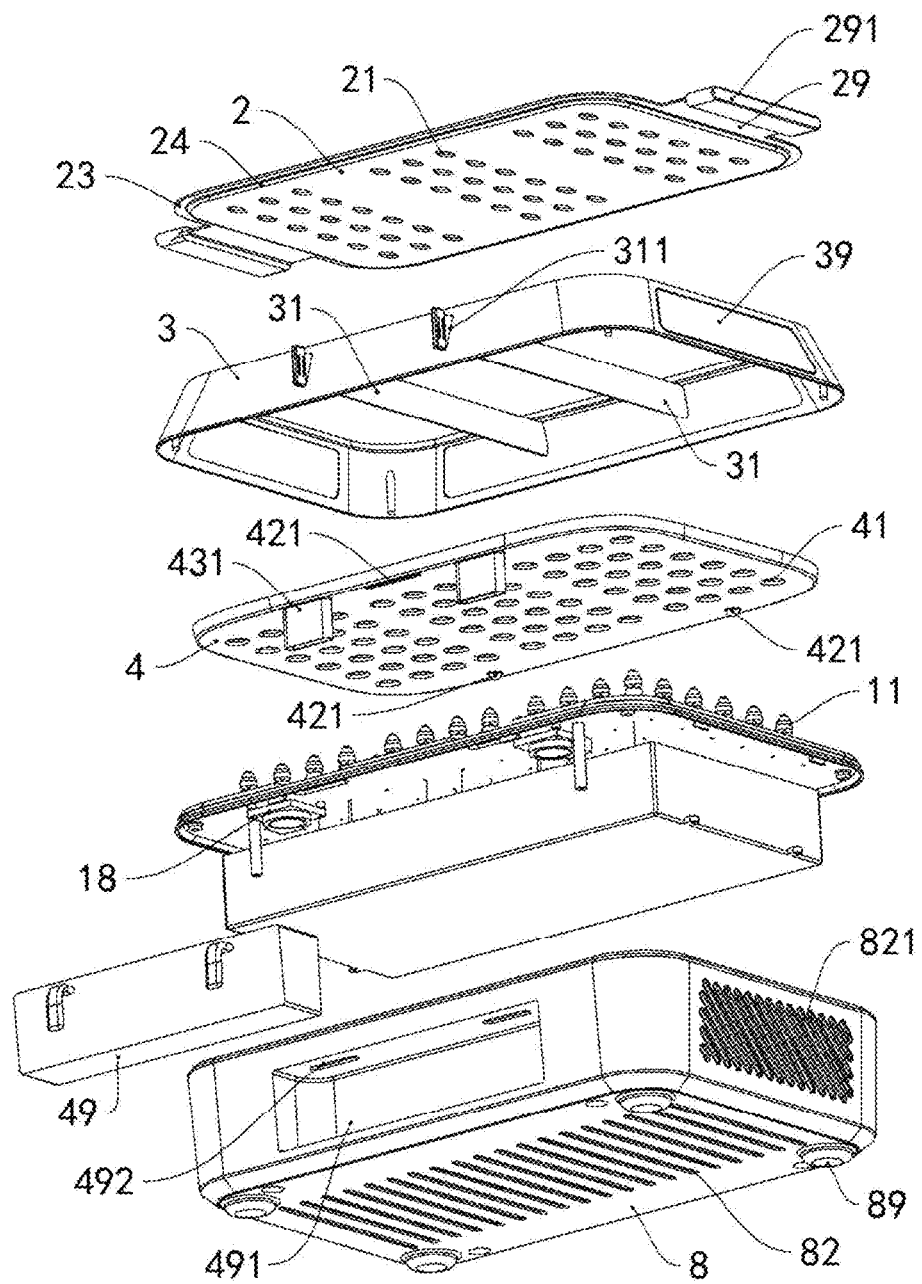
FIG. 4 is another exploded view of the electric arc grill according to an embodiment of the present application.
Figure 5:
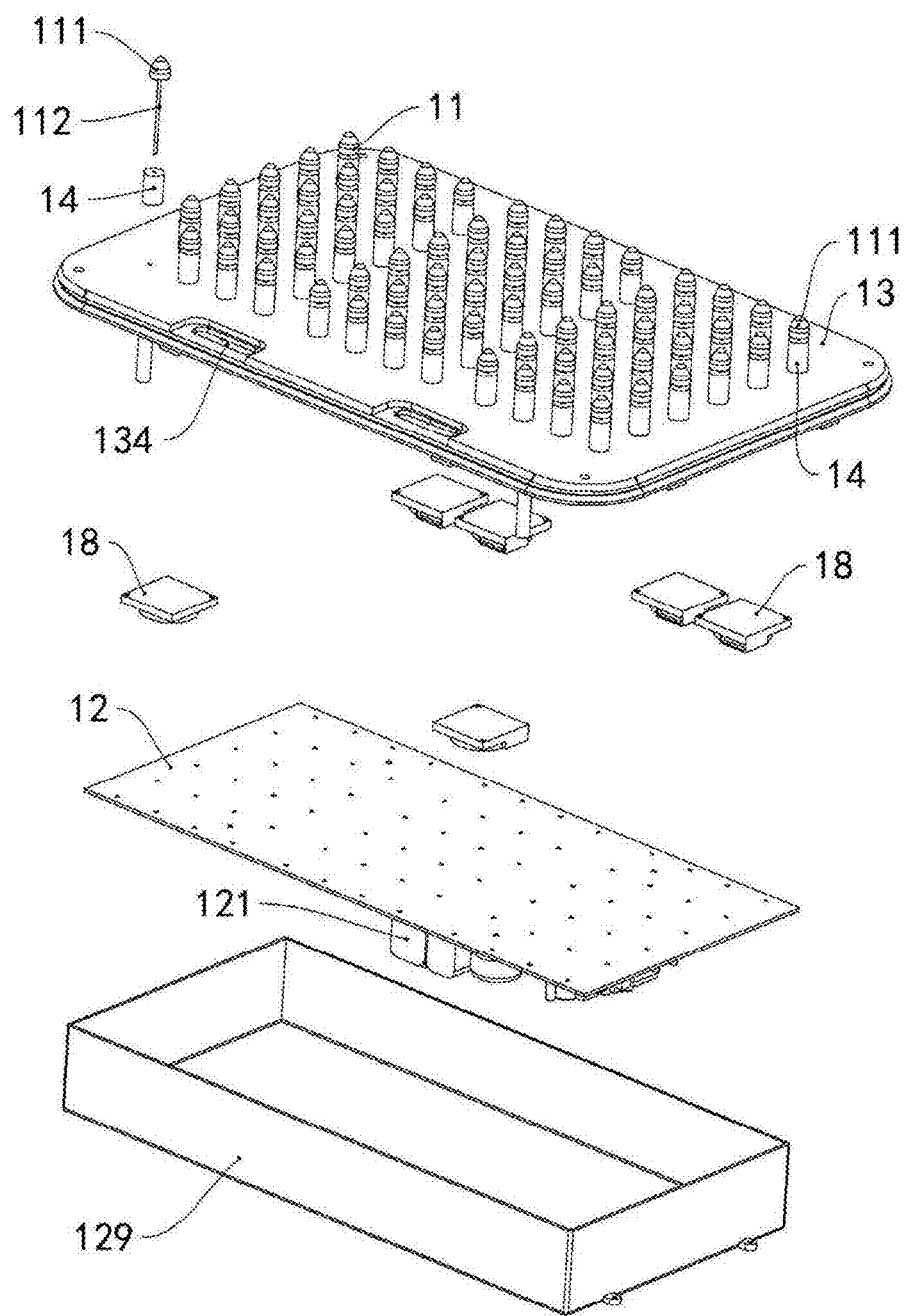
FIG. 5 is a diagrammatic view of an electric heating device of the electric arc grill according to an embodiment of the present application.

In at least one embodiment, at least one partition plate 31 is detachably connected to the lifting device 3. When there are a number of electric heating components 11, the electric heating components 11 are located on two opposite sides of each partition plate 31. For example, the electric heating components 11 are divided into three groups arranged along the length direction (as shown in FIG. 3, the electric heating component 11 of a single array belongs to one group). One partition plate 31 is located between the two groups of electric heating components 11, so there are two partition plates 31 in total. The circuit board 12 may control the electric heating components 11 to work independently. For example, the circuit board 12 may control the group of electric heating components 11 located in the center area to work, and the remaining two groups of electric heating components 11 to stop working. At this time, only the center area of the fire gathering plate 2 is heated by the group of electric heating components 11 located in the center area to achieve frying purpose, and the two side areas of the fire gathering plate 2 do not need to be heated to achieve heat preservation purpose. In addition, the partition plate 31 and the lifting device 3 cooperatively form more suitable (e.g., smaller) spaces, which may improve the stability of the electric arc. The partition plate 31 may further reduce the heat transfer and achieve the temperature difference on the fire gathering plate 2.

In at least one embodiment, each of the partition plates 31 extends through the sidewall of the lifting device 3 (i.e., through a partition plate slot 311 on the sidewall), and one end of the partition plates 31 is exposed from the sidewall of the lifting device 3. When all electric heating components 11 need to work, the partition plates 31 are easily removed from the lifting device 3.

In at least one embodiment, a front side of the grill carrier 8 is provided with at least one electrical element (not shown) that is electrically connected to the circuit board 12. The electrical element may be a potentiometer, a switch, or a display screen. A rear end of each partition plate 31 is exposed from the sidewall of lifting device 3.

In at least one embodiment, the sidewall of the lifting device 3 is provided with the window 39 that is transparent. For example, the window 39 is made of a heat insulation glass. The working state of the electric output heads 111 may be observed through the window 39. When the cross-section of the lifting device 3 decreases from bottom to top, it is more convenient to confirm the working state of the electric output heads 111 through the window 39.

The terms used in the present application, such as "first" and "second", do not intended to indicate any order, quantity, or importance of related components, but are only used for differentiation between the related components.

As used in the present application, the term "a" or "one" do not intended to limit the quantity of the related object, but to indicate the existence of at least one related object.

In the present application, the terms indicating direction or position, such as "top", "bottom", "side", "longitudinal", "transverse", "middle", "center, "outer", "inner", "horizontal", "vertical", "left", "right", "upper", and "lower", refers to a relative position rather than an absolute position.

The terms used in the present application, such as "substantially", "whole", "approximate", and "similar", are intended to indicate that the object has related characteristics but allow for certain deviations. The deviation may depend on a specific background. For example, the dimension of deviation may depend on a specific background, including but not limited to national standards for dimensional tolerances.

What is claimed is:

1. An electric arc grill, comprising:
an electric heating device comprising at least one electric heating component and a circuit board, the circuit board comprising an electric component;
a fire gathering plate;
a lifting device; and
a grill carrier;
wherein the at least one electric heating component comprises an electric output head and an electric connection rod electrically connected to the electric output head, the electric connection rod is further fixed and electrically connected to the circuit board, the lifting device is connected to the grill carrier and grounded, the fire gathering plate is electrically connected to the lifting device, the electric output head is located below the fire gathering plate, and a gap is formed between the electric output head and the fire gathering plate.

2. The electric arc grill according to claim 1, wherein the at least one electric heating components comprises a plurality of electric heating components, and the plurality of electric output heads is positioned at a same horizontal height.

3. The electric arc grill according to claim 2, wherein a connection member is provided on a bottom surface of the circuit board, and a bottom end of the electric connection rod extends through the circuit board and is soldered to the solder pad.

4. The electric arc grill according to claim 1, wherein the fire gathering plate defines a through hole, and a projection of the through hole in a vertical direction does not overlap with a projection of the electric output head in the vertical direction.

5. The electric arc grill according to claim 4, wherein a projection of the through holes as a whole in the vertical direction is rhombic, rectangular, or elliptical, and a length of the through hole is different from a width of the through hole.

6. The electric arc grill according to claim 1, further comprising an oil receiving plate, wherein the oil receiving plate defines an electric heating component hole, the oil receiving plate is located between the electric output head and the circuit board, the electric connection rod extends through the electric heating component hole, the oil receiving plate is detachably connected to at least one of the circuit board, the fire gathering plate, the lifting device, the electric heating device, and the grill carrier, and an included angle is formed between a top surface of the oil receiving plate and a horizontal plane.

7. The electric arc grill according to claim 6, further comprising an oil receiving tray, wherein the grill carrier comprises a tray slot and an oil output slot connected to the tray slot, a top surface of the oil receiving tray defines an opening, the oil receiving tray is located in the tray slot, thereby defining a flow passage for oil stains to flow from a lower area of the oil receiving plate into the oil receiving tray through the oil output slot.

8. The electric arc grill according to claim 6, wherein the oil receiving plate comprises a height adjustment protrusion on a bottom surface of the oil receiving plate, and the height adjustment protrusion abuts against the circuit board.

9. The electric arc grill according to claim 1, wherein the lifting device has a hollow frame structure, the fire gathering plate is detachably connected to the lifting device and covers a top opening of the lifting device, the electric output head and the lifting device are partially overlapped with each other in a height direction, and a distance between the electric output head and a bottom surface of the fire gathering plate is less than a distance between the electric output head and an inner wall of the lifting device.

10. The electric arc grill according to claim 9, further comprising a partition plate, wherein the partition plate is detachably connected to the lifting device, the at least one electric heating component comprises a plurality of electric heating components, and the plurality of electric heating components is located on two opposite sides of the partition plate.

11. The electric arc grill according to claim 10, wherein the partition plate extends through a sidewall of the lifting device, and one end of the partition plate is exposed from the sidewall of the lifting device (3).

12. The electric arc grill according to claim 10, wherein the plurality of electric heating components is divided into at least two groups of electric heating components, and the circuit board is configured to control the at least two groups of electric heating components to work independently.

13. The electric arc grill according to claim 1, wherein the fire gathering plate comprises a handle and a heat insulation sleeve surrounding the handle.

14. The electric arc grill according to claim 1, further comprising an electric insulation plate, wherein the electric insulation plate is located between the electric output head and the circuit board, and the electric connection rod extends through the electric insulation plate.

15. The electric arc grill according to claim 14, further comprising an air driving device, wherein the air driving device is fixed on one of the electric insulation plate, the circuit board, and the grill carrier, and the air driving device is configured to output air along a direction parallel to the circuit board.

16. The electric arc grill according to claim 1, wherein a bottom surface of the grill carrier defines an air vent.

17. The electric arc grill according to claim 1, wherein a sidewall of the grill carrier defines an air vent.

18. The electric arc grill according to claim 1, further comprising an electric insulation sleeve surrounding the electric connection rod.

19. The electric arc grill according to claim 1, further comprising a metal isolation cover surrounding the circuit board.

20. The electric arc grill according to claim 1, further comprising a window located on a sidewall of the lifting device.

* * * * *